United States Patent
Bestgen et al.

(10) Patent No.: US 8,997,813 B2
(45) Date of Patent: Apr. 7, 2015

(54) LIGHT TIRE

(75) Inventors: Luc Bestgen, Chatel-Guyon (FR); Alain Valle, Cebazat (FR)

(73) Assignees: Michelin Recherche et Technique S.A., Granges-Paccot (CH); Compagnie Generale des Etablissements Michelin, Clemont-Ferrand (FR)

( * ) Notice: Subject to any disclaimer, the term of this patent is extended or adjusted under 35 U.S.C. 154(b) by 400 days.

(21) Appl. No.: 12/808,243

(22) PCT Filed: Dec. 15, 2008

(86) PCT No.: PCT/EP2008/067486
§ 371 (c)(1),
(2), (4) Date: Sep. 7, 2010

(87) PCT Pub. No.: WO2009/077474
PCT Pub. Date: Jun. 25, 2009

(65) Prior Publication Data
US 2011/0132514 A1 Jun. 9, 2011

(30) Foreign Application Priority Data
Dec. 18, 2007 (FR) .................................. 07 59952

(51) Int. Cl.
*B60C 15/00* (2006.01)
*B60C 9/18* (2006.01)
(Continued)

(52) U.S. Cl.
CPC ............... *B60C 9/07* (2013.01); *B60C 9/2009* (2013.04); *B60C 9/28* (2013.01); *B60C 15/0036* (2013.04); *B60C 15/0045* (2013.04); *B60C 2200/10* (2013.04); *Y10T 152/10855* (2015.01)

(58) Field of Classification Search
None
See application file for complete search history.

(56) References Cited

U.S. PATENT DOCUMENTS 2,493,614 A 1/1950 Marcel
3,550,666 A * 12/1970 Menell et al. ................. 152/538
(Continued)

FOREIGN PATENT DOCUMENTS

FR 2 178 000 11/1973
FR 2 797 213 2/2001
(Continued)

OTHER PUBLICATIONS
Machine translation of JP 2006-199236, 2006.*
(Continued)

*Primary Examiner* — Justin Fischer
(74) *Attorney, Agent, or Firm* — Cozen O'Connor

(57) ABSTRACT

A tire comprising at least one carcass-type reinforcing structure anchored on each side of the tire to a bead, each bead extending radially outwards in the form of a sidewall, the sidewalls radially towards the outside meeting a tread, and comprising, under the tread, a crown reinforcing structure consisting of at least one layer of reinforcing elements making angles of between 10° and 60° with the circumferential direction and known as a working layer, radially on the outside of the carcass-type reinforcing structure. In the sidewalls, the tire comprises at least two axially adjacent carcass reinforcing layer portions, the reinforcing elements of the said carcass reinforcing layer portions crossing those of a next layer by an angle of 5° at most, at least in the equatorial plane, the reinforcing elements of the carcass reinforcement making an angle of less than 80° with the circumferential direction and the reinforcing elements of at least one working layer crossing the reinforcing elements of the carcass-type reinforcing structure at an angle greater than 40°.

9 Claims, 3 Drawing Sheets

(51) Int. Cl.
*B60C 9/07* (2006.01)
*B60C 9/20* (2006.01)
*B60C 9/28* (2006.01)

(56) References Cited

U.S. PATENT DOCUMENTS

| | | | |
|---|---|---|---|
| 3,568,749 A * | 3/1971 | Menell et al. | 152/538 |
| 4,724,881 A * | 2/1988 | Poque et al. | 152/527 |
| 5,730,815 A * | 3/1998 | Sakamoto et al. | 152/554 |
| 6,802,923 B2 * | 10/2004 | Ahouanto et al. | 156/130 |
| 7,828,028 B2 * | 11/2010 | Aoki | 152/526 |
| 2006/0048879 A1 * | 3/2006 | Kuwayama | 152/534 |
| 2007/0235117 A1 * | 10/2007 | Tanaka | 152/541 |

FOREIGN PATENT DOCUMENTS

| | | | |
|---|---|---|---|
| GB | 1102547 | * | 2/1968 |
| GB | 1 477 210 | | 6/1977 |
| JP | 2001-246910 | * | 9/2001 |
| JP | 2006-199236 | * | 8/2006 |
| JP | 2007 237922 | | 9/2007 |
| WO | WO 2005/065970 | * | 7/2005 |

OTHER PUBLICATIONS

Machine translation of JP 2001-246910, 2001.*

* cited by examiner

LIGHT TIRE

RELATED APPLICATIONS

This is a U.S. national stage under 35 USC §371 of application No. PCT/EP2008/067486, filed on Dec. 15, 2008.

This application claims the priority of French application no. 07/59952 filed Dec. 18, 2007, the entire content of which is hereby incorporated by reference.

FIELD OF THE INVENTION

The present invention relates to a lighter tire intended to be fitted to a vehicle and, more particularly, intended to be fitted to a two-wheeled vehicle such as a motorcycle.

Although not limited to such applications, the invention will be more particularly described with reference to such a motorcycle, or motorbike, tire.

BACKGROUND OF THE INVENTION

The reinforcement or reinforcing armature of tires, particularly motorcycle tires currently—and most often—consists of a stack of one or more plies conventionally known as "carcass plies", "crown plies", etc. This way of describing the reinforcements stems from the method of manufacture, which consists in creating a series of semi-finished products in the form of plies, provided with thread-like reinforcements, often longitudinal, which are subsequently assembled or stacked to build up a green tire. The plies are produced flat, to large dimensions, and then cut to suit the dimensions of a given product. At least some of the semi-finished products are assembled, to start off with, substantially flat. The green tire thus created is then shaped to give it the torroidal profile typical of tires. The so-called "finishing" semi-finished products are then applied to the green tire to obtain a product ready to be vulcanized.

A "conventional" type of method such as this entails, particularly in the phase of building up the green tire, the use of an anchoring element (generally a bead wire) which is used to anchor or hold the carcass reinforcement in the region of the beads of the tire. Thus, for this type of method, a portion of all the plies that make up the carcass reinforcement (or just part thereof) is folded back around a bead wire positioned in the bead of the tire. This then anchors the carcass reinforcement in the bead.

The widespread use within industry of this type of conventional product, in spite of there being numerous variations on the way in which the plies and assemblies are formed, has lead those skilled in the art to use vocabulary hinged on the method: hence the generally accepted terminology involving in particular the terms "plies", "carcass", "bead wire", "shaping" to denote the progression from a flat profile to a torroidal profile, etc.

Nowadays there are tires which do not strictly speaking have any "plies" or "bead wires" conforming to the above definitions. For example, document EP 0 582 196 describes tires manufactured without the use of semi-finished products in the form of plies. For example, the reinforcing elements of the various reinforcing structures are applied directly to the adjacent layers of rubber compounds, all of this being applied in successive layers to a torroidal core the shape of which means that a profile likenable to the final profile of the tire being manufactured can be obtained directly. Thus, in such cases, there are no longer any "semi-finished products" or any "plies", or any "bead wires". The basic products, such as the rubber compounds and the reinforcing elements in the form of threads or filaments, are applied directly to the core. Because this core is of torroidal shape, there is no longer any need to build up a green tire to evolve from a flat profile to a torus-shaped profile.

Moreover, the tires described in that document do not have the "traditional" folding of the carcass ply back around a bead wire. This type of anchorage is replaced by an arrangement whereby circumferential threads are positioned adjacent to the said sidewall reinforcing structure, all of it embedded in an anchoring or bonding rubber compound.

There are also methods of assembly on a torroidal core that use semi-finished products that are specially designed for rapid, effective and simple laying onto a central core. Finally, it is also possible to use a hybrid comprising both some semi-finished products for creating certain architectural aspects (such as plies, bead wires, etc.) while others are created by applying compounds and/or reinforcing elements directly.

In this document, in order to take account of the recent technological advances both in the field of the manufacture and in terms of the design of the products, the conventional terms such as "plies", "bead wires", etc., are advantageously replaced with terms which are neutral or independent of the type of method used. Thus, the term "carcass-type reinforcement" or "sidewall reinforcement" is a valid way of denoting the reinforcing elements of a carcass ply in the conventional method and the corresponding reinforcing elements, generally applied in the sidewalls, of a tire produced according to a method that does not employ semi-finished products. The term "anchoring zone", for its part, can just as easily denote the "traditional" folding-back of the carcass ply around a bead wire in a conventional method as it can the assembly formed by the circumferential reinforcing elements, the rubber compound, and the adjacent sidewall reinforcing portions of a bottom zone created using a method that involves application onto a torroidal core.

As in the case of all other tires, motorcycle tires are switching over to a radial design and such tires comprise a carcass reinforcement formed of one or two layers of reinforcing elements making angles that may range between 65° and 90° with the circumferential direction, the said carcass reinforcement being radially surmounted by a crown reinforcement formed at least of generally textile reinforcing elements. However, non-radial tires still remain and the invention applies equally to these. The invention also relates to partially radial tires, that is to say tires in which the reinforcing elements of the carcass reinforcement are radial over at least part of the said carcass reinforcement, for example in the part corresponding to the sidewall of the tire.

Numerous crown reinforcement designs have been proposed, according to whether the tire is intended to be mounted on the front of the motorbike or on the rear. A first structure consists, for the said crown reinforcement, in using only circumferential cords, and the said structure is more particularly used on the rear tire. A second structure, inspired directly by the structures commonly used for passenger vehicle tires, has been used to improve wear resistance, and consists in using at least two crown layers of reinforcing elements that are mutually parallel within each layer but cross from one layer to the next, making acute angles with the circumferential direction, such tires being more particularly suited to the front of motorbikes. The said two crown layers may be radially surmounted by at least one layer of circumferential elements, generally obtained by helically winding a strip of at least one rubber-coated reinforcing element. Patent FR 2 561 588 thus describes such a crown reinforcement, with at least one layer the reinforcing elements of which make an angle that may vary between 0° and 8° with the circumferential direction, the elastic modulus of such elements being as high as at least 6000 N/mm² and, positioned between the carcass reinforcement and the layer of circumferential elements, a cushioning layer made up mainly of two layers of elements that are crossed from one layer to the next, making angles of between 60° and 90° with one another, the said crossed layers being formed of textile reinforcing elements with an elastic modulus of at least 6000 N/mm².

U.S. Pat. No. 5,301,730, with a view to increasing the drive of a tire for a motorbike rear tire, proposes a crown reinforcement made up, from the radial carcass reinforcement to the tread, of at least one ply of substantially circumferential elements and of two plies of elements that cross from one ply to the next making an angle that may range between 35° and 55° with the circumferential direction, the ply of elements parallel to the circumferential direction possibly being made of aromatic polyamide elements and the plies of crossed elements of aliphatic polyamide.

SUMMARY OF THE INVENTION

It is an object of the invention to allow the creation of a lightened tire for motorcycles, without thereby detracting from the other properties needed to satisfy users, particularly by preserving satisfactory endurance properties and allowing properties of sufficiently high tire cornering rigidity with sufficiently high maximum tire speed.

This object has been achieved according to one aspect of the invention directed to a tire comprising at least one carcass-type reinforcing structure formed of at least one layer of mutually parallel reinforcing elements and anchored on each side of the tire to a bead, each bead extending radially outwards in the form of a sidewall, the sidewalls radially towards the outside meeting a tread, and comprising, under the tread, a crown reinforcing structure consisting of at least one layer of reinforcing elements making angles of between 10° and 60° with the circumferential direction and known as a working layer, radially on the outside of the carcass-type reinforcing structure, and in the sidewalls, the tire comprising at least two axially adjacent carcass reinforcing layer portions, the reinforcing elements of the said carcass reinforcing layer portions crossing those of a next layer by an angle of 5° at most, at least in the equatorial plane, the reinforcing elements of the carcass reinforcement making an angle of less than 80° with the circumferential direction and, at least in the equatorial plane, the reinforcing elements of at least one working layer crossing the reinforcing elements of the carcass-type reinforcing structure at an angle greater than 40°.

This object has been achieved according to the invention using a tire comprising at least one carcass-type reinforcing structure formed of at least one layer of mutually parallel reinforcing elements and anchored on each side of the tire to a bead, each bead extending radially outwards in the form of a sidewall, the sidewalls radially towards the outside meeting a tread, and comprising, under the tread, a crown reinforcing structure consisting of at least one layer of reinforcing elements making angles of between 10° and 60° with the circumferential direction and known as a working layer, radially on the outside of the carcass-type reinforcing structure, and in the sidewalls, the tire comprising at least two axially adjacent carcass reinforcing layer portions, the reinforcing elements of the said carcass reinforcing layer portions crossing those of a next layer by an angle of 5° at most, at least in the equatorial plane, the reinforcing elements of the carcass reinforcement making an angle of less than 80° with the circumferential direction and, at least in the equatorial plane, the reinforcing elements of at least one working layer crossing the reinforcing elements of the carcass-type reinforcing structure at an angle greater than 40°.

The circumferential direction of the tire, or longitudinal direction, is the direction that corresponds to the periphery of the tire and is defined by the direction of running of the tire.

A circumferential plane or circumferential plane of section is a plane perpendicular to the axis of rotation of the tire. The equatorial plane is the circumferential plane that passes through the centre or crown of the tread.

A radial or meridian plane is a plane containing the axis of rotation of the tire.

The axis of rotation of the tire is the axis about which it rotates in normal use.

The transverse, meridian or axial direction of the tire is parallel to the axis of rotation of the tire.

The invention thus described makes it possible, for example, to produce a tire comprising a single carcass layer and a single working crown layer and therefore makes it possible to produce a tire that is lightened because there are very few layers of reinforcing elements. A tire such as this is also more economical to produce firstly because of the lower quantity of materials and secondly because of the theoretically shorter manufacturing time, the amount of material that has to be set in place being reduced by comparison with a usual tire.

Tests carried out on motorcycles with tires according to the invention have demonstrated that they were able to provide satisfactory cornering rigidities notably because of the crossing of the reinforcing elements in the working layer with the reinforcing elements in the carcass-tire reinforcing structure by an angle greater than 40°.

According to one preferred embodiment of the invention, at least in the equatorial plane, the reinforcing elements of at least one working layer and the reinforcing elements of the carcass-type reinforcing structure are directed in opposite directions in relation to the equatorial plane.

Further, the maximum permissible speeds with such a tire are satisfactory for applications to motorcycles of the road-going motorcycle type, the said tire according to the invention authorizing speeds in excess of those obtained with certain tires of more conventional design comprising notably several working plies in which the reinforcing elements cross from one ply to the next.

Moreover, in the case of "traditional" manufacture involving a shaping step, the invention may allow the said working crown layer to be fitted before the said shaping step.

In particular, the inventors have been able to demonstrate that fitting the said working layer before the shaping step in a so-called "traditional" method of manufacture simplifies the production of the tire according to the invention and therefore further reduces the cost of manufacture thereof; specifically, the presence of the working layer prior to the shaping step may notably allow the fitting of a carcass reinforcement, the reinforcing elements of which make with the circumferential direction an angle that is constant over the entire axial width thereof so that, after shaping, the said carcass reinforcement makes a different angle in the working layer, notably under the tread, compared with the angle in the sidewalls in order to satisfy the definition of the tire according to the invention.

For preference, at least in the equatorial plane, the reinforcing elements of at least one working layer make an angle smaller than 45° with the circumferential direction. Such an embodiment of the invention notably makes it possible further to increase the cornering rigidity of the tire.

For preference also, with the tire comprising at least two working layers, the invention makes provision for all of the reinforcing elements of two superposed working layers to be oriented in the same direction with respect to the meridian direction and preferably for the reinforcing elements to be crossed from one layer to the next layer by an angle of 5° at most. According to such an embodiment of the invention, the presence of two working layers before a shaping step may, as previously, allow the fitting of a carcass reinforcement, the reinforcing elements of which form an angle with the circumferential direction that is constant over the entire axial width thereof in order after shaping to obtain a different angle of the said carcass reinforcement under the tread as compared with in the sidewalls in order to satisfy the definition of the tire according to the invention.

According to other embodiments of the invention, the tire may comprise several working layers, just one of them being fitted before the shaping step during the manufacture of the tire.

According to the invention, notably when the tire comprises just one carcass layer turned back around a bead wire in the bead, the reinforcing elements of the carcass layer and the reinforcing elements in its turned-back portion make an angle of 5° at most and, for preference, all of the reinforcing elements are oriented in the same direction with respect to a meridian direction.

A preferred variant of the invention makes provision that, particularly in the side walls, the reinforcing elements of the carcass layers make angles of between 65° and 90° with the circumferential direction. According to this variant embodiment of the invention, the angles formed by the reinforcing elements of the carcass structure comply with the standards such that the tire can be termed a radial tire for use with motorcycles when the reinforcing elements of the carcass layers comply with these angles over the entire length of the carcass layers.

Advantageously also, in the sidewalls of the tires, the reinforcing elements of the carcass layers make, with the circumferential direction, angles in excess of 85° and more preferably still, strictly in excess of 87°.

An advantageous variant of the invention makes provision for the angle formed by the reinforcing elements of the working layer and the reinforcing elements of the carcass-type reinforcing structure to be greater than 70°. Such a variant embodiment of the invention makes it possible further to improve the cornering rigidity of the tire.

According to a preferred embodiment of the invention, with at least one carcass layer comprising a part turned back around a bead wire in the bead, the end of at least one turned-back portion of carcass layer is superposed on an end of at least one working layer and preferably over a length of at least 3 mm. Superposing a turned-back portion of carcass layer with one end of a working layer as proposed in the invention notably allows an improvement in the high-speed straight line integrity.

Advantageously too, according to a first variant embodiment of the invention, with at least one carcass layer comprising a part turned back around a bead wire in the bead, the radial distance between the end of at least one turned-back portion of carcass layer and the radially interior end of the bead wire ranges between 50% and 75% of the radial distance between a shoulder end and the radially interior end of the bead wire. According to this first variant embodiment of the invention, it is possible to improve the stability and/or the handling of a motorbike fitted with such a tire.

A shoulder end is defined, in the shoulder zone of the tire, when the latter is mounted on its service rim and inflated, by the orthogonal projection onto the exterior surface of the tire of the intersection of the tangents to the surfaces of an axially exterior end of the tread, on the one hand, and of the radially exterior end of a side wall, on the other.

According to a second variant embodiment of the invention, with at least one carcass layer comprising a part turned back around a bead wire in the bead, the end of at least one turned-back portion of carcass layer extends under the tread. Producing a tire according to this second variant of the invention, aside from affording an improvement in terms of handling and stability, further contributes to improving the cornering rigidity of the tire.

According to either one of these variant embodiments of the invention, as stated previously, the turned back portion of the carcass layer may be superposed with an end of at least one working layer, said working layer then extending at least into part of the side wall in the case of the first variant embodiment.

According to one embodiment of the invention, the invention also advantageously makes provision, when the turned-back portion of the carcass layer is superposed with an end of at least one working layer, for the end of at least one turned-back portion of carcass layer to be positioned between at least one carcass layer and the working layer.

According to another embodiment of the invention, the end of at least one turned-back portion of carcass layer is positioned axially and/or radially on the outside of the working layer.

A preferred embodiment of the invention makes provision for the tire notably to consist of a crown reinforcing structure which further comprises at least one layer of circumferential reinforcing elements; according to the invention, the layer of circumferential reinforcing elements consists of at least one reinforcing element oriented at an angle of less than 5° with the longitudinal direction.

An advantageous embodiment of the invention makes provision for the layer of circumferential reinforcing elements to be positioned radially on the outside of at least part of a working layer.

The layer of circumferential reinforcing elements may thus be produced directly under the tread in order, in addition to performing its main function, to form a protective layer protecting the carcass and the other layers of the crown reinforcing structure from any mechanical attack.

The layer of circumferential reinforcing elements may also be produced between two working layers, notably for economic reasons, the amount of material and the laying time thus being reduced. According to such an embodiment of the invention and notably in the case of a manufacturing technique involving a shaping step, the layer of circumferential reinforcing elements and the radially outermost working layer are laid after the shaping step.

Another advantageous embodiment of the invention makes provision for the layer of circumferential reinforcing elements to be positioned at least partially radially on the inside of the radially interior working layer. According to this embodiment, the layer of circumferential reinforcing elements is produced radially on the inside of the working layers and may notably improve the grip and drive of the tire. Such an embodiment of the invention then preferably entails production using a hard core tire technique.

Another variant of the invention makes provision for at least one layer of circumferential reinforcing elements to be positioned at least partially radially on the inside of the carcass-type reinforcing structure. According to this variant of the invention, the tire is then preferably produced using a manufacturing technique of the type involving a hard core or rigid form.

According to a preferred embodiment of the invention, the reinforcing elements of the working layers are made of textile.

For preference also, the reinforcing elements of the layer of circumferential reinforcing elements are made of metal and/or textile and/or glass. The invention notably makes provision for the use of reinforcing elements of different kinds within one and the same layer of circumferential reinforcing elements.

For preference also, the reinforcing elements of the layer of circumferential reinforcing elements have an elastic modulus in excess of 6000 N/mm$^2$.

BRIEF DESCRIPTION OF THE DRAWINGS

Other details and advantageous features of the invention will become apparent hereinafter from the description of some exemplary embodiments of the invention, made with reference to FIGS. 1 to 3 which depict.

DETAILED DESCRIPTION OF THE INVENTION

Figure 1:
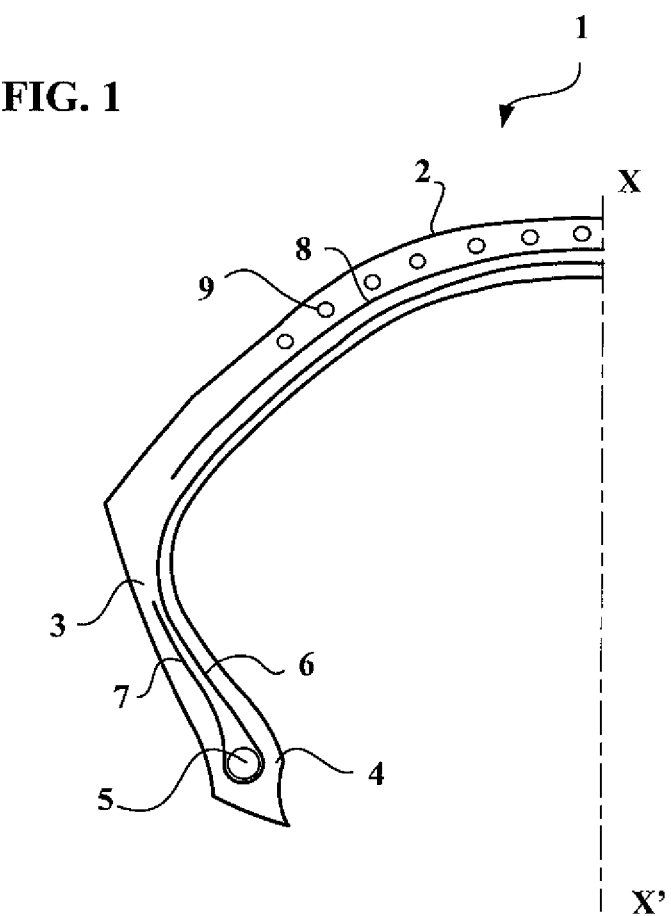
FIG. 1: a meridian view of a diagram of a tire according to a first embodiment of the invention.
Figure 2:
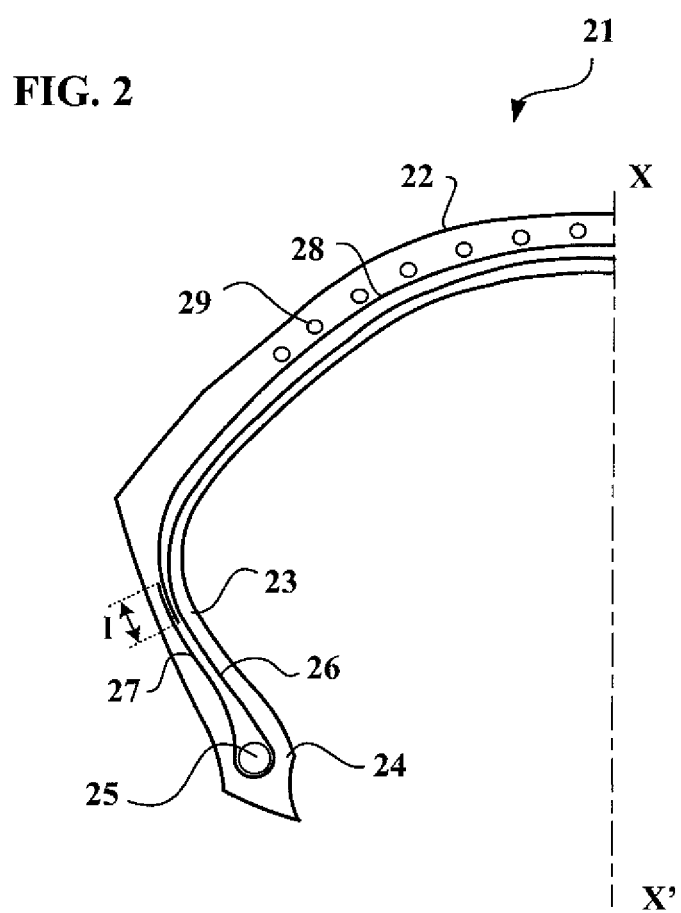
FIG. 2: a meridian view of a diagram of a tire according to a second embodiment of the invention.
Figure 3:
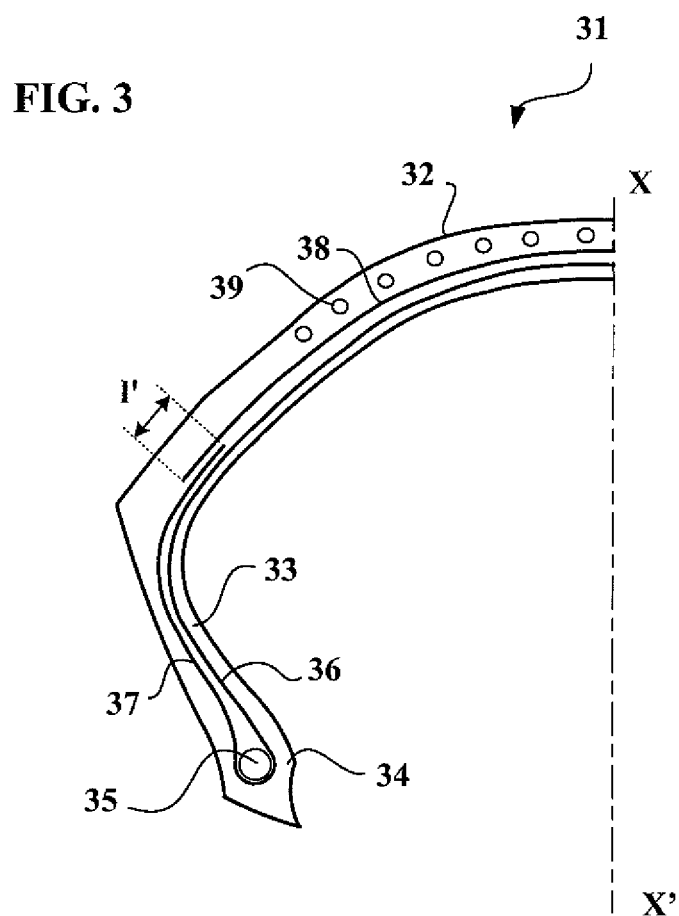
FIG. 3: a meridian view of a diagram of a tire according to a third embodiment of the invention.

To simplify understanding thereof; FIGS. 1 to 3 are not drawn to scale. The figures depict only half a view of a tire which continues symmetrically with respect to the axis XX' which represents the circumferential median plane, or equatorial plane, of a tire.

FIG. 1 shows a motorcycle tire 1 of size 120/70 ZR 17 (58W). This tire 1 comprises a tread 2 connected by a sidewall 3 to a bead 4. The bead comprises a bead wire 5 around which a carcass reinforcement consisting of a single layer 6 that forms a turned-back portion 7 is anchored. The layer 6 comprising textile reinforcing elements of the rayon type making an angle equal to 90° with the circumferential direction in the sidewalls. The angle formed by the reinforcing elements in the turned-back portion 7 of the carcass reinforcement also make an angle of substantially 90° with respect to the circumferential direction.

Under the tread 2 the carcass reinforcement is radially surmounted by a crown reinforcement consisting of a layer 8 of textile reinforcing elements of the rayon type making an angle of 43° with the circumferential direction in the equatorial plane.

The angle formed with the circumferential direction by the reinforcing elements of the layer 6 under the tread and more specifically radially under the layer 8, is equal to −73° in the equatorial plane.

The difference between the angles formed with the circumferential direction of the reinforcing elements of the layer 6 and those of the layer 8 is equal to 116° and therefore greater than 40° at the equatorial plane and therefore over the entire width of said layer 8.

A tire 1 such as this is advantageously manufactured according to a method of manufacture that involves a shaping step. The carcass reinforcement layer 6 comprising reinforcing elements that make an angle of 90° to the circumferential direction is fitted. The layer 8 comprising reinforcing elements that make an angle equal to 45° is then laid radially on the outside of the carcass reinforcing layer 2. During the shaping step, the angles formed between the circumferential direction and the reinforcing elements of the layer 6 and of its turned-back portion 7 are preserved in the sidewalls whereas the angle formed by the reinforcing elements of the layer 6 and the circumferential direction under the tread is modified to achieve a value of −73° in the crown of the tire, that is to say at the equatorial plane. The angle formed by the reinforcing elements of the layer 8 and the circumferential direction is slightly modified after shaping, changing from 45° to 43° in the crown of the tire, that is to say in the equatorial plane. These variations in angle observed after shaping are less pronounced at the ends of the layer 8.

The layer of circumferential reinforcing elements 9 is fitted after the shaping step.

Such a layer of circumferential reinforcing elements advantageously consists of a single thread wound to make an angle substantially equal to 0° with the longitudinal direction. A layer of circumferential reinforcing elements may also be achieved by simultaneously winding several bare threads or threads in the form of strips when they are embedded in rubber.

FIG. 2 depicts a tire 21 similar to that of FIG. 1 except that the layer of reinforcing elements 28 extends into the upper part of the side wall 23. In this FIG. 2, the end of this layer 28 is then axially interposed between the carcass reinforcing layer 26 and the end of the turned-back portion 27 thereof. The overlap between the end of the turned-back portion 27 and the layer of reinforcing elements 28 extends over a length l of about 8 mm. This region of overlap will lead to a slight modification to the angle of the reinforcing elements of the layer 26 and of its turned-back portion 27 in this area of overlap. The modifications in angle observed are smaller than what may be observed in the central part of the layer 28 because the coupling between the reinforcing elements is very weak because of the presence of the ends of the reinforcing elements of the layer 28.

The tires thus manufactured show that in such instances in which the layer 28 overlaps the turned-back portion of the carcass reinforcement 27, the maximum value of 5° between the angles formed with the circumferential direction of the elements of the various layers of carcass reinforcement is preserved. Furthermore, the orientation of the reinforcing elements with respect to a meridian direction is the same for the elements of the carcass reinforcing layer 26 and for the reinforcing elements of the turned-back portion 27 thereof.

The tire 21 of FIG. 2 further comprises a layer 29 of circumferential reinforcing elements made of aramid radially outside the layer 28.

FIG. 3 depicts a tire 31 similar to that of FIG. 1 except that the turned-back portion 37 of the carcass reinforcing layer 36 extends under part of the tread 32. In this FIG. 3, the end of the layer 38 is therefore axially interposed between the carcass reinforcing layer 36 and the end of the turned-back portion 37 thereof. The overlap between the end of the turned-back portion 37 and the layer of reinforcing elements 38 extends over a length l' of about 6 mm. As in the case of FIG. 2, this region of overlap will lead to a slight modification to the angle of the reinforcing elements of the layer 36 and of the turned-back portion 37 thereof in this area of overlap. The modifications in angle observed are smaller than may be observed in the central part of the layer 38 because the coupling between the reinforcing elements is very weak because of the presence of the ends of the reinforcing elements of the layer 38.

As in the case of the tire depicted in FIG. 2, the tires manufactured in this way show that, in such cases of overlapping of the layer 38 with the turned-back portion of the carcass reinforcement 37, the maximum value of 5° between the angles formed with the circumferential direction of the elements of the various layers of carcass reinforcement is preserved. Furthermore, the orientation of the reinforcing elements with respect to a meridian direction is the same for the elements of the carcass reinforcing layer 36 and for the reinforcing elements of the turned-back portion 37 thereof.

The tire 31 in FIG. 3 also comprises a layer 39 of circumferential reinforcing elements made of aramid radially on the outside of the layer 38.

The invention should not be interpreted as being limited to the examples illustrated in the figures but of course extends to other variant embodiments. The invention extends, notably in the case of tires that have an overlap between the turned-back portion of the carcass reinforcement and the layer of reinforcing elements that make up the crown reinforcement, to configurations in which either the end of the crown reinforcing layer is inserted between two carcass reinforcing portions or the end of a carcass portion, for example the end of a turned-back portion, is inserted between a carcass reinforcing layer and the end of a crown reinforcing layer.

The invention even extends to tires that may comprise several carcass reinforcing layers and/or several working layers as stated previously.

The invention is also aimed at tires manufactured using methods of the hard core type, it being possible for such tires not to have bead wires in the strictest sense, as explained previously.

The tires according to the invention may also comprise other types of reinforcing element such as, for example, reinforcing elements directed in the circumferential direction and which at least in part extend into the sidewalls as described in Patent Application WO 02/09956.

Tests and measurements have been conducted on a tire according to the one depicted in FIG. 3.

Reference tests were conducted in parallel using three types of tire of the same size and of conventional design for this type of size.

The tires were mounted on a 3.5 MT 17 rim, inflated to the same pressure of 2.5 bar and subjected to a load of 115 kg.

The first reference tire (reference 1) consisted of two carcass reinforcing layers made up of reinforcing elements made of rayon, crossing from one layer to the next and making angles of 75° to the circumferential direction, radially surmounted by one layer of circumferential reinforcing elements made of aramid.

The second reference tire (reference 2) consisted of two carcass reinforcing layers consisting of reinforcing elements made of rayon making angles of 90° with the circumferential direction, and of two working crown layers consisting of aramid reinforcing elements and making angles of +25° and −25° to the circumferential direction.

The third reference tire (reference 3) consisted of two carcass reinforcing layers consisting of reinforcing elements made of rayon, crossing from one layer to the next and making angles of 75° to the circumferential direction, of one layer of circumferential reinforcing elements made of aramid radially surmounted by two working crown layers consisting of reinforcing elements made of nylon and making angles of +30° and −30° to the circumferential direction.

The tests involved measuring, on the one hand, the maximum running speeds and, on the other hand, the cornering rigidities, on rolling machines.

The various results obtained are summarized in the table that follows in the form of relative data in relation to a basis 100, set on the basis of the best of the performances of the three reference tires.

|  | Reference 1 | Reference 2 | Reference 3 | Invention (FIG. 2) |
| --- | --- | --- | --- | --- |
| Maximum speed | 100 | 80 | 90 | 100 |
| Cornering rigidity | 80 | 100 | 100 | 100 |

The values indicated in this table show that the tire according to the invention has the best performance in terms both of maximum speed that can be achieved and in terms of cornering rigidity, with an overall structure that is lightened or, at the very least, substantially identical, in terms of the amount of reinforcing elements and therefore in terms of mass.

Specifically, the tire according to the invention with a simplified architecture is of course lighter in weight and may be less expensive to produce because, on the one hand, of the smaller quantities of materials used and, on the other hand, because of the production time which can be reduced accordingly.

The invention claimed is:

1. A tire comprising:
   at least one carcass-type reinforcing structure formed of at least one layer of mutually parallel reinforcing elements and anchored on each side of the tire to a bead, each bead extending radially outwards forming a sidewall, each formed sidewall extending radially towards the outside and meeting a tread; and
   a crown reinforcing structure arranged under the tread and comprising at least two superposed layers of reinforcing elements making angles of between 10° and 60° with a circumferential direction and forming at least two superposed working layers, radially on an outside of the at least one carcass type reinforcing structure,
   wherein all the angles formed by the reinforcing elements of the at least one layer of mutually parallel reinforcing elements of the carcass-type reinforcing structure fall between 65° and 90° with the circumferential direction;
   wherein the at least one carcass-type reinforcing structure comprises at least two axially adjacent carcass reinforcing layer portions in each formed sidewall;
   wherein reinforcing elements of each of said at least two axially adjacent carcass reinforcing layer portions cross those of a next layer by an angle of 5° at most;
   wherein, at least in an equatorial plane, the reinforcing elements of the at least one carcass-type reinforcing structure make an angle of less than 80° with the circumferential direction;
   wherein the reinforcing elements of one of the at least two superposed working layers cross reinforcing elements of a next working layer by an angle of 5° at most;
   wherein, at least in the equatorial plane, the reinforcing elements of at least one of the at least two working layers cross the reinforcing elements of the at least one carcass-type reinforcing structure at an angle greater than 40°,
   wherein at least one of the at least two carcass reinforcing layer portions comprises a part turned back around a bead wire in the bead, and
   wherein an end of the at least one turned-back carcass reinforcement layer overlaps with an end of at least one of the at least two working layers in the sidewall of the tire.

2. The tire according to claim 1, wherein, at least in the equatorial plane, the reinforcing elements of at least one of the at least two working layers make an angle smaller than 45° with the circumferential direction.

3. The tire according to claim 1, wherein at least one of the at least two carcass reinforcing layer portions comprises a part turned back around a bead wire in the bead; and wherein the reinforcing elements of another of the at least two carcass reinforcement layer portions and the reinforcing elements in the at least one turned-back carcass reinforcing layer portion make an angle of 5° at most with respect to one another.

4. The tire according to claim 1, wherein, at least in part of the sidewalls, the reinforcing elements of the at least two axially adjacent carcass reinforcing layer portions make angles greater than 85° with the circumferential direction.

5. The tire according to claim 1, wherein the angle formed by the reinforcing elements of at least one of the at least two working layers and the at least one layer of the mutually parallel reinforcing elements of the carcass-type reinforcing structure is greater than 70°.

6. The tire according to claim 1, wherein at least one of the at least two carcass reinforcing layer portions comprises a part turned back around a bead wire in the bead; and wherein a radial distance between an end of the at least one turned-back carcass reinforcing layer portion and a radially interior end of the bead wire ranges between 50% and 75% of a radial distance between a shoulder end and a radially interior end of the bead wire.

7. The tire according to claim 1, wherein reinforcing elements of the at least two working layers are made of at least one of metal, textile and glass.

8. The tire according to claim 1, wherein reinforcing elements of the at least two working layers are made of textile.

9. The tire according to claim 1, wherein the end of the at least one turned-back carcass reinforcing layer portion is superposed axially outside the end of at least one working layer of the at least two working layers over a length of at least 3 mm.

* * * * *